July 25, 1967 — G. H. F. DE VRIES — 3,333,080

METHOD OF WORKING A THIN METAL BODY BY SPARK EROSION

Filed Feb. 17, 1964

INVENTOR.
GERHARD H.F. DE VRIES
BY
*Frank R. Trifari*
AGENT

United States Patent Office 3,333,080
Patented July 25, 1967

3,333,080
METHOD OF WORKING A THIN METAL BODY BY SPARK EROSION
Gerhard Heinrich Friedrich de Vries, Emmasingel, Eindhoven, Netherlands, assignor to North American Philips Company, Inc., New York, N.Y., a corporation of Delaware
Filed Feb. 17, 1964, Ser. No. 345,489
Claims priority, application Netherlands, Mar. 29, 1963, 290,932
2 Claims. (Cl. 219—69)

The invention relates to a method of reducing the thickness of a thin metal body by means of spark erosion and in particular to reducing the thickness of beryllium windows in X-ray, counting or contact, microradiography tubes.

Reducing the thickness of beryllium foil on the order of 150 microns to a uniform thickness, for instance in the order of 20 microns, by mechanical means is very difficult due to the brittle nature of beryllium. These difficulties are overcome by reducing the foil thickness by spark erosion techniques. However, the known spark erosion techniques are not suitable if the foil has a corrugated or non-planar profile, i.e. a uniformly reduced thickness will not be obtained by park eroding a foil of uniform thickness but having a non-planar cross-sectional profile.

The invention is based on recognition of the fact that spark erosion is a reversible phenomenon. That is, the spark erosion tool may be eroded by reversing the polarity between the tool and the work piece. Thus, according to the invention, the surface of the tool opposite the work piece, but not parallel thereto, is first eroded to provide opposed parallel surfaces between the work piece and the tool. The polarity between the tool and work piece is then reversed so that the work piece is reduced in thickness by erosion. The work piece thus eroded will have a uniform reduced thickness even though it is non-planar in cross-sectional profile (corrugated or the like).

In connection with the foregoing, it is noted that copending application Ser. No. 273,126, now abandoned discloses a spark erosion method and its use is shaping a spark erosion tool by utilizing an auxiliary piece or standard having a desired configuration. In that method a complementary outline of the desired workpiece profile is first formed in the auxiliary piece by spark erosion. The workpiece is then eroded to the desired configuration by means of the auxiliary workpiece.

An object of the invention therefore is to provide a method of uniformly reducing the thickness of non-planar beryllium foil, or the like, by spark erosion.

The foregoing object and advantages and other objects and advantages will become apparent from the following detailed description in conjunction with the accompanying drawing in which.

Figure 3:
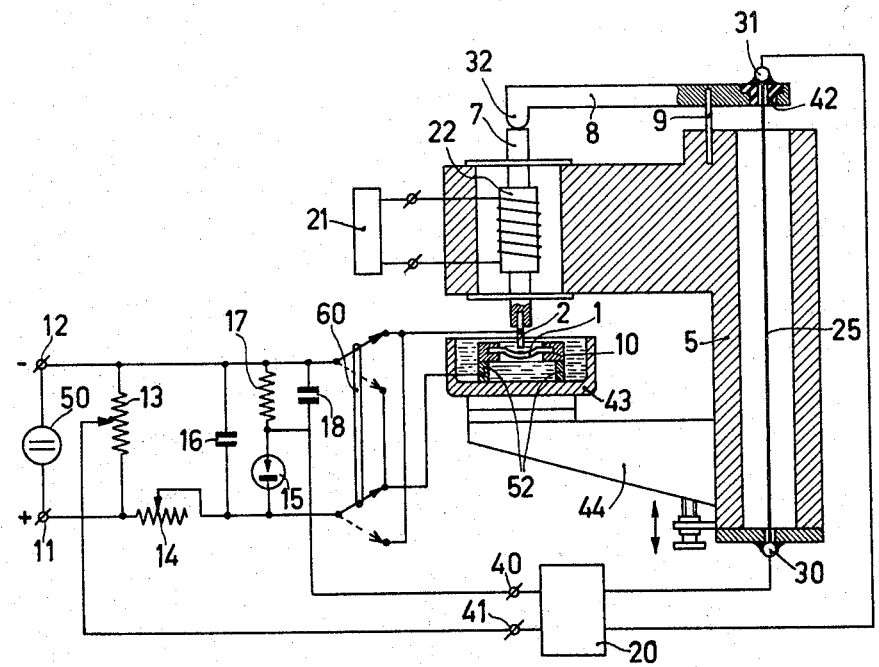
FIG. 3 is an apparatus for carrying out the method of spark erosion according to the invention.
Figure 1:
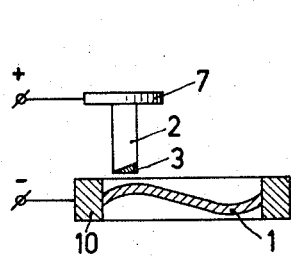
FIG. 1 is a diagrammatic illustration showing the step of spark eroding the tool and FIG. 2 is a like illustration showing the step of eroding the foil to a uniform reduced thickness.

Referring to the three figures, reference numeral 1 designates a metal foil soldered to a fairly thick meal ring 10. The foil may be obtained for example by rolling a sheet and has substantially the same thickness throughout. During the soldering process the foil is deformed so that its flatness is lost. Therefore, to provide parallel confronting surfaces between the adjacent surfaces of the tool 2 and foil 1, a voltage is applied between the tool or electrode 2 and the foil 1. The electrode 2 is connected via a metal plate 7 to the positive terminal of a voltage source and the foil 1 is connected to the negative terminal of this voltage source. With a suitable choice of the distance between the foil 1 and the electrode 2 spark discharges occur between them. Thus the opposite surfaces of the foil and the electrode are eroded. Since the electrode 2 is at a positive voltage relative to the foil 1, the electrode will be eroded more strongly than the foil. With a suitable choice of the material of the electrode and the foil, erosion of the foil can be prevented substantially completely. The erosion process will be continued until the surface of the electrode facing the foil has assumed the same shape as the part of the foil lying opposite the electrode. It is necessary to move the electrode slowly towards the foil during the erosion process in an axial direction. The cross-hatched part 3 of the electrode 2 is eroded.

Figure 2:
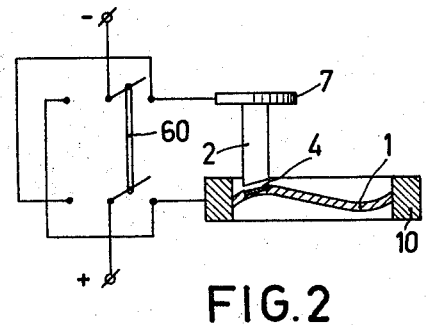

When, in accordance with the invention, the connections of the foil and the electrode to the voltage source are then interchanged by means of the switch 60, the part 4 of the foil 1 (indicated by cross-hatching in FIG. 2) will be removed without the need for displacement or reclamping of the foil. Then the thickness of the foil beneath the electrode is uniformly reduced.

The process described may be repeated by shifting the electrode over the surface of the foil, so that a foil is obtained having a uniform thickness or uniformly reduced thickness. By suitable displacement and/or by suitable shaping of the electrode it can be ensured that the thin sectors of the foil are not directly in contact with each other, but are separated from each other by ribs. Thus a strengthened foil is obtained.

In the drawing reference numeral 1 designates a window of beryllium, which may be in place on an X-ray tube, in which the foil has an initial thickness of 150 microns. After the spark erosion process according to the invention a foil of a thickness of 20 microns was obtained. The electrode 2 was made of Cu.

FIGURE 3 shows an embodiment of the apparatus by means of which the foil 1 can be eroded. The apparatus has been described in more detail in the copending U.S. application Ser. No. 334,879, filed Dec. 31, 1963.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:
1. An improved method of working a thin metal body by spark erosion comprising the steps of placing a thin metal body and electrode tool in operative relation to one another for spark erosion working, applying a voltage potential of given polarity between the said body and tool so that said tool is eroded until the adjacen surfaces of said tool and the opposite surface of said body are substantially parallel, and changing the polarit between said tool and body to uniformly reduce th thickness of said body opposite said tool.

2. An improved method of working a thin metal bod by spark erosion comprising the steps of placing a thi metal body of non-uniform cross sectional profile and a electrode tool in operative relation to one another fc spark erosion working, applying a voltage potential c given polarity between said body and tool so that sai tool is eroded until the opposite adjacent surfaces c said tool and the discrete opposed surface of said bod are parallel, changing the polarity between said tool and body while moving said tool and body toward each other to uniformly reduces the thickness of said body opposite said tool, separating said tool and body, laterally displacing said tool and body and repeating the above enumerated steps to provide an area of said body of uniformly reduced thickness.

References Cited

UNITED STATES PATENTS 3,240,914  3/1966  Hill et al. _____ 219—69

RICHARD M. WOOD, *Primary Examiner.*

R. F. STAUBLY, *Assistant Examiner.*